Aug. 1, 1950 P. BJERRE ET AL 2,517,172
POWER LIFT CLUTCH
Filed July 20, 1945 2 Sheets-Sheet 1

INVENTOR.
PEDER BJERRE
HOWARD M. JOHNSTON
BY A.S. Krebs
ATTORNEY

Aug. 1, 1950     P. BJERRE ET AL     2,517,172
POWER LIFT CLUTCH

Filed July 20, 1945     2 Sheets-Sheet 2

INVENTOR.
PEDER BJERRE
HOWARD M. JOHNSTON
BY A. S. Krob
ATTORNEY

Patented Aug. 1, 1950

2,517,172

UNITED STATES PATENT OFFICE 2,517,172

POWER LIFT CLUTCH

Peder Bjerre and Howard M. Johnston, Toronto, Ontario, Canada, assignors to Massey-Harris Co. Ltd., Toronto, Ontario, Canada, a corporation of Canada Application July 20, 1945, Serial No. 606,262

1 Claim. (Cl. 192—62)

The present invention relates to what is commonly termed half turn clutches, for use as a power lifting device on implements and the like and as a direct connection to tractors for lifting implements which are directly coupled to the tractor.

In conventional half turn clutches the mechanism acts to raise the implement or device when a lever is pulled and when it is desired to lower the device the same lever is pulled again and the device is released so that the implement or device falls by gravity to its working position. This is not a desirable feature because for example, with a plow the point of one of the bottoms may strike a hard surface resulting in the breaking of the point or loosening the share. Furthermore, for example, with a conventional power lift, when the plow is released it must find its full depth by gravity. This is a disadvantage especially when plowing hard ground and the weight of the plow is not sufficient to force it quickly to its full depth.

In our device, means are provided whereby the clutch is definitely engaged for both power raising and lowering the device being served, so the device is lowered at practically the same speed and as definitely as it is raised. In other words, the applicants' device does not depend upon gravity, but does depend upon the power mechanism of the tractor or a ground wheel on the plow or implement.

Generally stated the object of the present invention, in addition to those already defined, is to provide a device of the character which is simple, easily manufactured at low cost and is durable and highly efficient.

To these and other useful ends our invention consists of parts, combinations of parts or their equivalents and mode of operation as hereinafter described and claimed and shown in the accompanying drawings in which:

Figure 1:
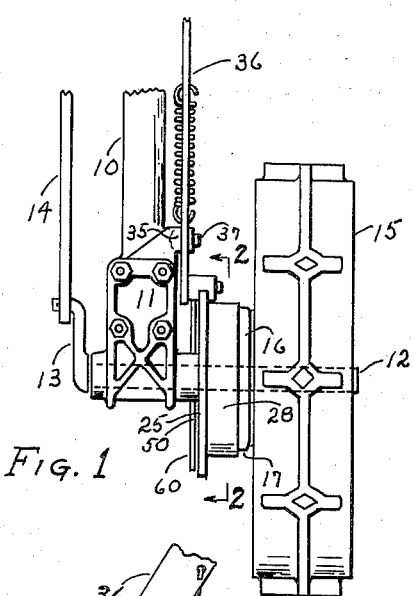
Fig. 1 is a top view of our device as used on a plow, a fraction only of the parts which are directly coupled to the plow being shown and the device being shown as when the plow is in a raised or lifted position.

As thus illustrated an arm 10 is at its rear end hingedly attached to the frame of a plow or device to be lifted. We secure a bracket 11 to the front end of member 10 in which an axle 12 is rotatably mounted, the inner end of which is provided with a crank 13 which is rotably engaged by the lower end of a link 14, the upper end of which is connected to the plow or device to be lifted.

A ground wheel 15 is rotatably mounted on axle 12 a distance from bracket 11 and having secured to its inner side a clutch member 16, the periphery having an annular flange 17 with serrations 18 on its inner surface. A driven clutch member 25 has a hub 26 key seated to axle 12 as at 27, the outer end of this hub resting preferably against the hub (not shown) of wheel 15. On the outer general periphery of member 25 we provide an outwardly extending annular flange 28 which loosely surrounds a portion of member 17 as a dust shield. Member 25 is provided with two pockets 29—29 formed by leading projections 30—30 and following projections 31—31.

We provide a projection 35 on bracket 11 to which a lever 36 is pivoted as at 37, this lever having rotatably mounted on its lower end a roller 38 as at 39, the roller being adapted to fit into pockets 29. Bracket 11 is provided with a depending arm 40. A spring 41 forms an operating connection between lever 36 and member 40 so roller 38 is firmly spring held into pockets 29; whereby when the lever is pulled and the clutch begins to turn for raising or lowering the plow, roller 38 will ride on the outer surfaces of members 28, 30 and 31; thus it will be seen that roller 38 may hold clutch member 25 in two different positions, one as shown in Figure 1 as when the plow is lifted and the other in the position to hold crank 13 in its lower position as when the plow is in an operating position.

We provide engaging means between members 16 and 25 as follows: bars 50 are secured to a shaft 51, the shaft rotatably extending through member 25 and having mounted on its inner end an arm 52, the arm having rotatably mounted on its free end, a roller 53. When member 50 is in the position shown in Figures 4 and 5 roller 53 rests in one of the pockets formed by serrations 18 because of a spring 54 which is anchored to a pin 55 secured to member 25 and to an extension 56 secured to arm 52; thus roller 53 will be spring held into the serrations 18 and moved from these serrations when roller 38 is moved into pockets 29 by spring 41. Another bar 60 is secured to a shaft 61 which rotatably extends through member 25, this bar 60 is acted upon by roller 38, similar to the action of this roller on bars 50.

Figure 4:
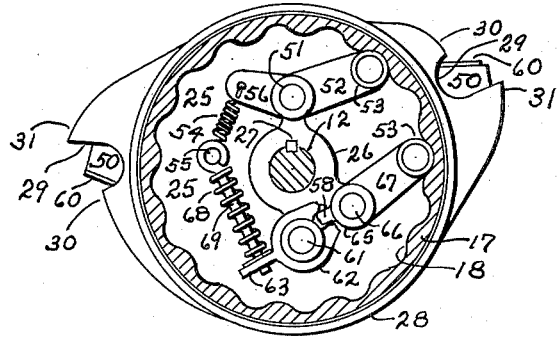
Fig. 4 is a view similar to Figure 2 with the clutch engaged.
Figure 5:
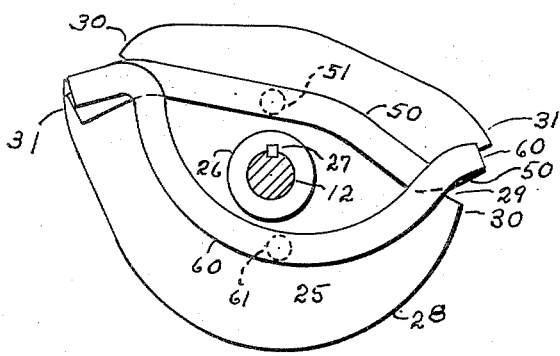
Fig. 5 is a view similar to Figure 3 showing the position of the clutch arms when the clutch is engaged as in Figure 4.

We secure a member 62 to the inner end of member 61. This member has a projection 63 through which a shaft 64 loosely extends, shaft 64 being anchored to member 55 as illustrated and having a spring 68; thus it will be seen that bars 50 and 60 will be spring moved to the position shown in Figures 4 and 5 when roller 38 is not in a pocket. Member 62 is provided with spaced projections 57—57 forming an opening for the free reception of tooth 58. This member is mounted on a hub 65 which is rotatably mounted on a shaft 66 which is rigidly secured to member 25. Hub 65 is provided with an arm 67 having rotatably mounted on its free end a roller 53 which is held in exactly the same position as roller 53 on arm 52 because of spring 68 so that when roller 38 is in either pocket 29, both rollers 53 will be in the position shown in Figure 2 and when roller 38 is moved from a pocket by pulling a rope which is secured to the upper end of lever 36, both rollers will extend into a serration as illustrated in Figure 4.

Figure 2:
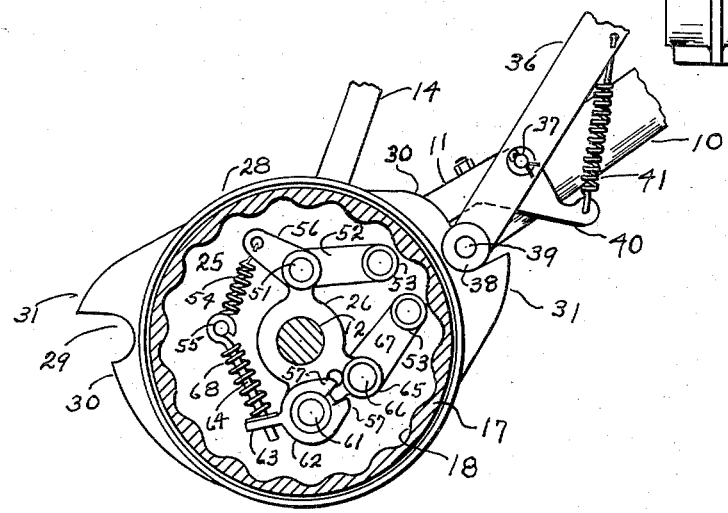
Fig. 2 is a sectional view taken on line 2—2 of Figure 1.
Figure 3:
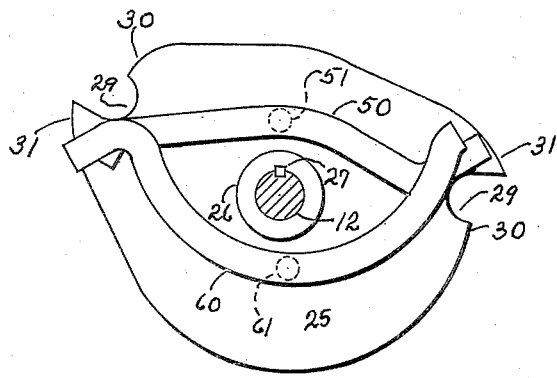
Fig. 3 is a view of the rear of the clutch showing the operating bars in the position as in Figures 1 and 2.

From the foregoing it will be seen that as shown in Figures 1 and 2, wheel 15 is free to turn on shaft 12 when the clutch is disengaged and that when the rope on the free end of lever 36 is pulled hard enough to release bars 50 and 60, rollers 53 will engage serrations 18 and as a result shaft 12 will be turned until roller 38 enters the pocket 29 on the other side of member 25, thus to release the clutch or the connection of wheel 15 to shaft 12; thus when crank 13 is in either position all that is necessary is to pull the rope, to move the crank to its other position for raising or lowering the plow, it being understood that link 14 at its upper end is connected to the plow frame by means of a lever or otherwise, whereby the depth plowed may be regulated. It will also be understood that when our power lift is mounted on the tractor, the rope may be dispensed with.

Clearly instead of the connections of bar 60, shafts 61 and 66 may be reversed and the bar secured directly to arm 67 with hub 62 rotatably mounted on its shaft.

Clearly lever 36 may be pivoted to an arm which is hingedly anchored at its lower end either to member 11 or to shaft 12, the other end being slidably held to a bracket on the device as is common practice.

Clearly we have provided a half turn power operated clutch which acts to raise and lower the plow or other device by means of power derived from an implement ground wheel or the power take-off on the tractor, and that the speed of movement is positive and determined by the speed of the driving means.

Having thus shown and described our invention, we claim:

In a half turn clutch of the character described comprising in combination, a driven shaft, a driver clutch member rotatably mounted on said driven shaft and having closely spaced internal depressions, a driven clutch member secured to said driven shaft and having on its periphery two depressions positioned on opposite sides thereof, two bars positioned on the outer side of said driven clutch member and being rotatably mounted thereon by means of separate shafts which are positioned on opposite sides of and adjacent the hub of said driven clutch member, the ends of said bars when moved forward being adapted to lie over said two depressions and extend outwardly past the forward sides of the two depressions, said bars having means adapted to yieldingly move their outer ends forward to cover said two depressions simultaneously, arms operatively connected to the inner ends of said bar shafts each having means adapted to engage an internal depression simultaneously when the ends of said bars are in a forward position, a controlling lever associated with said clutch having a roller and a spring adapted to urge the roller toward the periphery of said driven clutch member and into said two spaced depressions alternately and contact and move the ends of said bars rearwardly and out of alignment with the two spaced depressions when the driven member is turning, to thereby disengage said arms and move into one of said two depressions and lock the driven clutch member from further turning.

PEDER BJERRE.
HOWARD M. JOHNSTON.

REFERENCES CITED

The following references are of record in the file of this patent:

UNITED STATES PATENTS

| Number | Name | Date |
|---|---|---|
| 936,768 | Fjarli | Oct. 12, 1909 |
| 1,359,860 | Bartholomew | Nov. 23, 1920 |
| 1,561,611 | Lindgren | Nov. 17, 1925 |
| 1,933,540 | Brown | Nov. 7, 1933 |
| 1,967,826 | Kovar | July 24, 1934 |
| 2,156,362 | Strandlund | May 2, 1939 |